Figure 10:
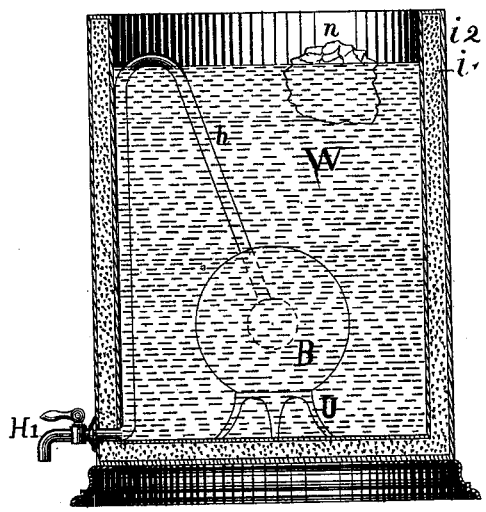

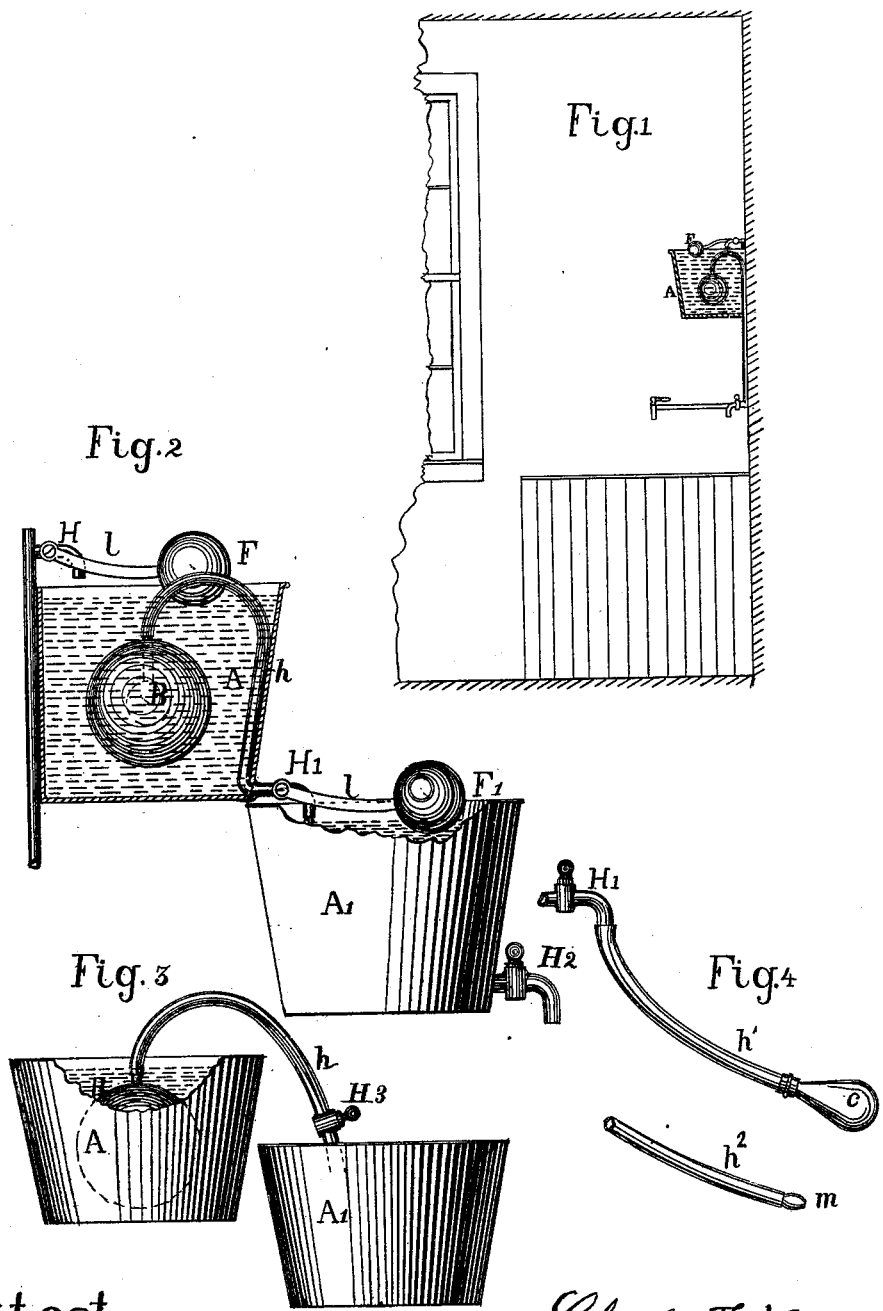

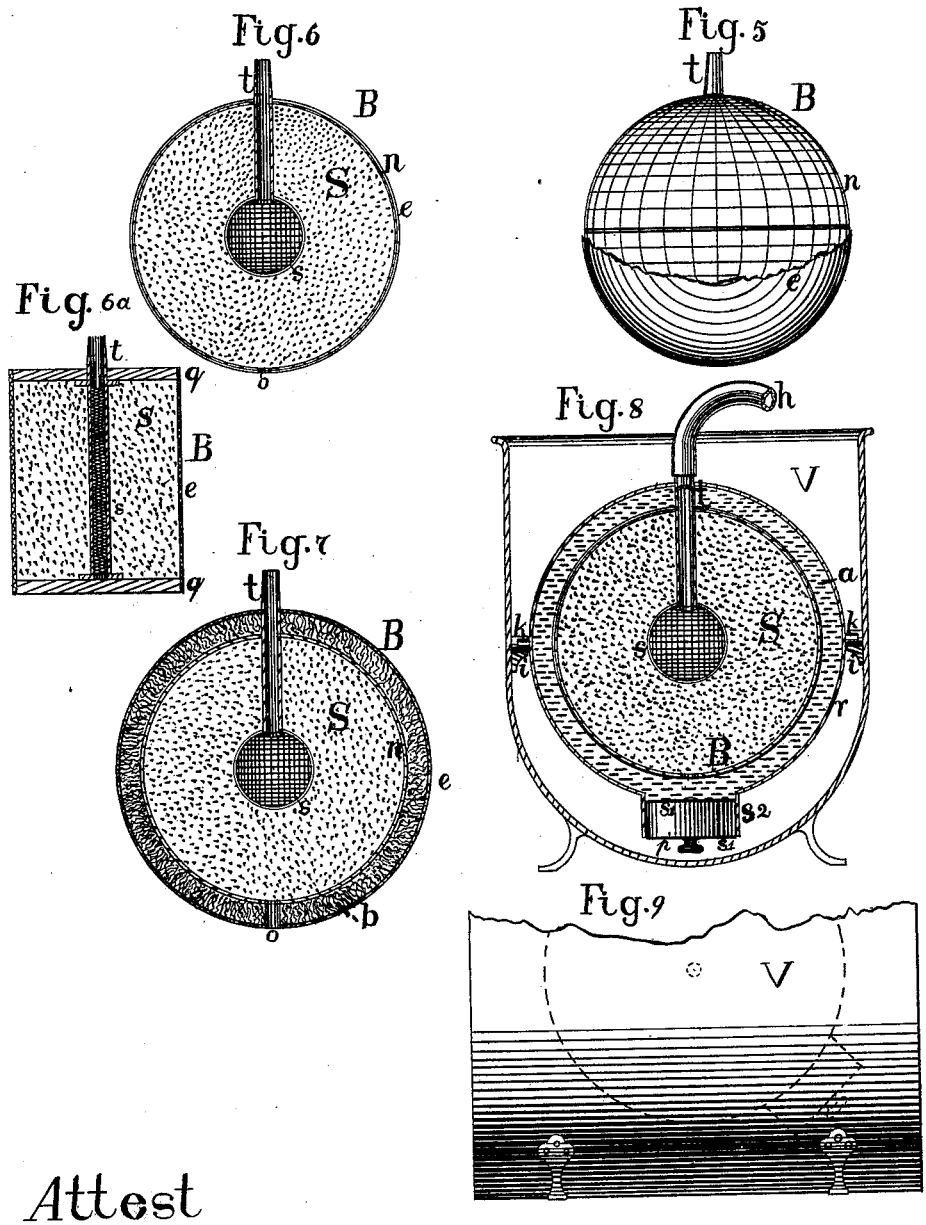
C. F. VENT.
LIQUID FILTERS.
No. 195,423.   Patented Sept. 18, 1877.
4 Sheets—Sheet 2.

4 Sheets—Sheet 3.

C. F. VENT.
LIQUID FILTERS.

No. 195,423. Patented Sept. 18, 1877.

Attest
Hermann Lautenschlager
C. Walton Jr.

Charles F. Vent per
Wm. Hubbell Fisher,
Atty

C. F. VENT.
LIQUID FILTERS.

No. 195,423. Patented Sept. 18, 1877.

Attest
Hermann Lautschlager
C. Walton Jr.

Charles F. Vent, per
Wm. Hubbell Fisher,
Atty

UNITED STATES PATENT OFFICE.

CHARLES F. VENT, OF CINCINNATI, OHIO.

IMPROVEMENT IN LIQUID-FILTERS.

Specification forming part of Letters Patent No. 195,423, dated September 18, 1877; application filed March 1, 1877.

*To all whom it may concern:*

Be it known that I, CHARLES F. VENT, of the city of Cincinnati and State of Ohio, have invented certain new and useful Improvements in Devices for Filtering Liquids, of which the following is a specification:

The main object of my invention is to provide a filter for liquids that should present the maximum of effectiveness, simplicity, durability, and cheapness, and that may, by different devices, be readily adapted to all the ordinary uses for which a filter can be called into requisition, for cisterns and wells, for domestic purposes, for hotels, steam-boilers, railroad-cars, steamboats, saloons, laundries, manufactories, for travelers, for rectifying spirits, &c.

My invention primarily consists of a filter which is most efficient when wholly immersed in the liquid to be filtered, the filter being preferably globular or cylindrical in form, and in general consisting of an outer porous or perforated material, which operates as a sustaining cover or shell, and contains a layer or layers of filtering material and a central receptacle for receiving the filtered liquid for delivery, any known means being attached to said central receptacle tending to produce a vacuum therein.

This filter is capable of acting very effectively as a dripping-filter; but the primary design of its construction is to use it in connection with the pressure of the atmosphere, so that the said pressure shall force the unfiltered liquid from the exterior through the filtering material to the central receptacle.

The advantages resulting from such employment of the filter are, first, the utilization of the pressure of the atmosphere by means of a vacuum, thereby hastening the process of filtration about fivefold over what is possible in any dripping-filter of like size where the force of gravity alone is called into requisition; secondly, the large amount of surface which the peculiar construction of my filter affords upon which to bring to bear the pressure of the atmosphere, thereby hastening the process of filtration; thirdly, the liquid, in being filtered, is compelled to pass through a like amount of filtering material in passing from the outer surface to the inner central receptacle, and thus a filtered liquid of a uniform grade is secured; fourthly, in nearly every other form of filter all of the solid matter held in suspension in the liquid is precipitated upon and largely forced into the filtering material, thus soon clogging it up and rendering it useless, whereas in my filter the bulk of the foreign matter in the liquid settles to the bottom of the vessel in which the filter is placed, and a large proportion of that which is not precipitated is arrested at the outer surface of the filter, and does not reach the main body of the filtering material; fifthly, space and material and labor in the construction of my filter are greatly economized; sixthly, the filter can be readily cleansed, thus rendering it practicable to use the same filtering material for an indefinite length of time; seventhly, its wide range of usefulness, as shown in its ready adaptability to so many purposes for which a filter can be profitably used.

The second part of my invention consists in the combination of a siphon with the delivery-receptacle of my said filter, whereby the filter, when partly or wholly immersed in the liquid to be filtered, will, by the aid of atmospheric pressure, rapidly and effectively filter said liquid, and deliver the filtered liquid from the long arm of said siphon.

The third part consists in the combination, with the filter and siphon, of a device for automatically furnishing to the filter a fresh supply of water, to be filtered as fast as the water is filtered and withdrawn.

Figure 11:
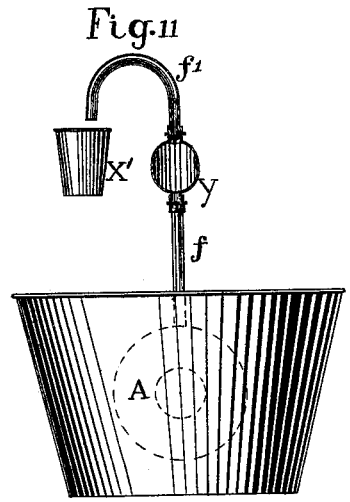
Figure 12:
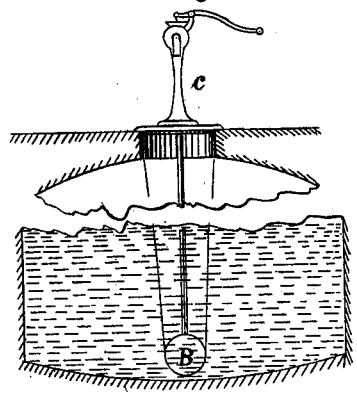
Figure 13:
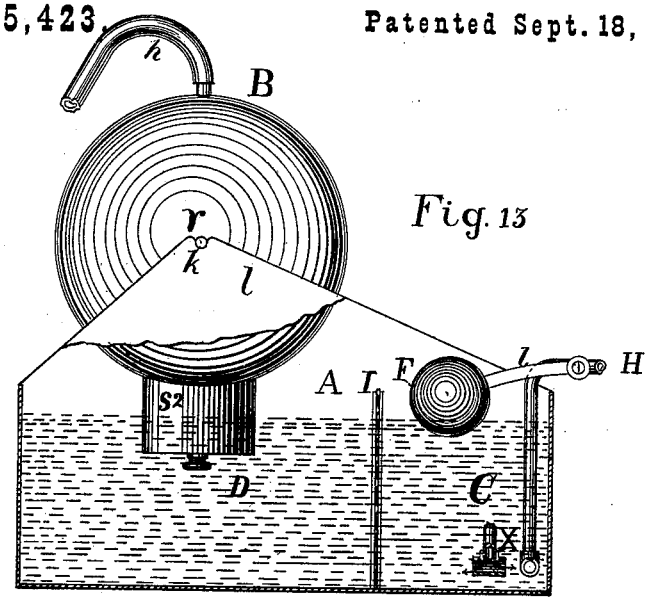
Figure 14:
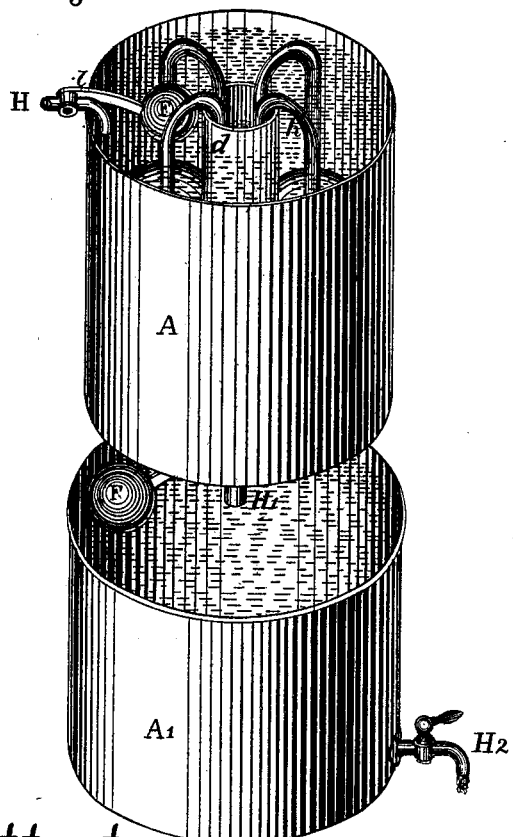
Figure 15:
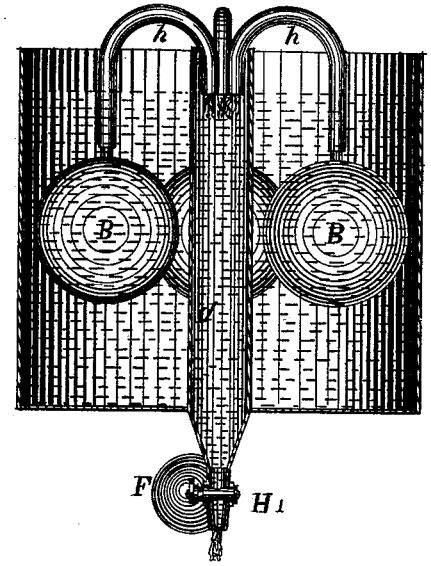

In the accompanying drawings, Figure 1 is a view of a portion of a room provided with a vessel containing my improved filter, together with a device for automatically shutting off the water when said vessel is filled, the delivery-tube of the filter being provided with a faucet for regulating the flow of filtered water. Fig. 2 is a view of my invention, the upper vessel containing the filter being shown in section, and the upper edge of the lower vessel being broken away to exhibit the device for automatically regulating the flow of water into the same. Fig. 3 illustrates the simplest mode of using my filter in connection with atmospheric pressure. Fig. 4 shows devices for starting the flow of water through the siphon of the filter. Fig. 5 illustrates that form of my filter where the outer cover is sustained by a frame-work, a portion of the cover being broken away that the frame-work can be seen. Fig. 6 is a central vertical section of that form of filter where the outer cover is sustained by a perforated shell, the central receptacle for receiving the filtered water being shown. Fig. 6a represents a vertical central section of a cylindrical filter embodying my invention. Fig. 7 is a central vertical section of a filter constructed with layers of different filtering materials. Fig. 8 shows a vertical central section of a filter illustrating the third part of my invention, and Fig. 9 is a side view of the vessel containing the filter shown in Fig. 8. Fig. 10 is a vertical central section of a water-cooler combining the functions of a filter and cooler in one vessel. Fig. 11 represents my filter combined with a globular elastic suction and force pump for travelers' use. Fig. 12 represents my filter as adapted for use in wells, cisterns, and the like. Fig. 13 shows a filter adapted for use where the water is especially turbid and muddy; and Figs. 14 and 15 illustrate a method of increasing the amount of filtered liquid, in a given length of time, to any desired extent.

As before stated, my filter, in its primary form, consists of a porous cover filled with filtering material and containing a central receptacle for the collection of the liquid which has been filtered by its passage through the filtering material from the periphery to the center, said receptacle having a suitable outlet.

In the construction of such a filter the cover is preferably of firm, strong Shaker flannel or felt, the joints being united in any suitable manner, preferably by sewing. Into this cover, before being entirely closed, are introduced, first, a receptacle for receiving the water which has passed through the filter. A necessary characteristic of this receptacle is a surface provided with interstices sufficiently large to admit of the passage of the filtered water through them, and sufficiently fine to exclude the filtering material surrounding it. A very desirable form of receptacle is that designated by B in Figs. 5, 6, 7, and 8, which consists of a hollow globe of very fine wire, connected to a tube, which conveys the filtered water which gathers in the globe to the siphon or place of delivery. This globe is preferably placed in the center of the space included in the cover, in order that the water to be filtered shall, in passing through the filter, pass through an equal amount of filtering material, from whatever direction it may pass into the filter.

The receptacle having been placed in position and the cover properly adjusted, I fill the intermediate space full of a suitable filtering material. I employ, preferably, what I understand to be a new filtering material, to the exclusive use of which I lay claim, viz., pure white sand or silex, such as is used in making glass of the finest quality, and prepared for use by the same process, viz., by washing and then heating, as before stated, to a sufficient extent to remove any impurities not taken out by the washing. The cover is then closed, and a cheap and very effective filter is the result.

Where it is desired to rigidly sustain the cover in any exact shape, a shell or frame work made in any suitable manner—as, for example, by casting, stamping from sheet metal fully perforated, or from wire cloth—may be placed next the cover, preferably within, as shown in Fig. 5, where $s$ is the cover, and $n$ the shell.

A perforated metal shell is shown in Fig. 6, where the shell is indicated by $n$. In such case the filtering material is introduced within the shell by means of an orifice, O, as shown.

Where a cylindrical form of filter is preferred to a globular one, a very convenient method of constructing the same is shown in Fig. 6a, where $g$ $g$ represent solid cylinder-heads, between which and along the axis of the cylinder extends the central receiving-receptacle $s$, provided at each end with a shoulder fastened to its respective head, and supporting the latter in position. The delivery-tube $t$, passing through one of the heads, is connected with the receptacle $s$. The filtering material S is surrounded with a porous cover, $e$, the latter being properly secured to the heads.

When it is desired to place within the filter two or more different kinds of filtering materials, they are to be placed in layers or strata, substantially in the manner shown in Fig. 7, where $e$ is the cover, $b$ a layer of one kind of filtering material, and S a layer of another kind of filtering material.

For mechanical filtering, the space $b$ may be filled with clay from which porous brick are made, or the like, and baked until it becomes sufficiently hard not to be dissolved by the action of the water in filtering through it. The space S may be filled with white sand, or, for the same purpose, the space S may be filled with brick material or the like, and the space $b$ with sand or other suitable material.

For chemical filtering, the inner space may be filled with charcoal and the outer with brick or similar material, or the outer with charcoal and the inner with brick or sand.

When the liquid to be filtered is very turbid the outer shell or cover $e$ may be, with advantage, covered with felting or a close-fitting canvas bag, or both, which may be taken off and washed when necessary.

The shell $n$ is preferably provided with an orifice, O, for the introduction of the filtering material which is to occupy the space S. The receptacle $s$ is placed in the center and connected with the tube $t$.

A convenient application of my filter is shown in Fig. 8, where $r$ represents a hollow shell, impervious, provided with a large orifice, terminating in an outwardly-projecting flange, $S^2$, forming a short cylinder. This cylinder is filled with a filtering material, preferably flannel or felt, tightly wrapped around a central core and pressed into the cylinder, and which may be easily taken out and washed, and then replaced. Within this shell $r$ is the filter B, constructed substantially as before described, and provided with receptacle $s$ and tube $t$. This filter B is smaller than the shell $r$, and hence there is a water-space between the shell and the filter B.

The shell is preferably arranged to oscillate upon pivots $k$ in open journal-boxes $i$, which latter allow the shell to be rotated and inverted, so that the orifice $S^1$ shall come to the top, and the filtering material may be drawn therefrom to be cleaned or renewed; also, through this cylinder or neck the filter B and the space $a$ surrounding it may be filled with water before immersing the mouth of the cylinder in the water in the tank below, and thus save the greater labor of exhausting the air by suction before the water would rise and fill said filter and space.

Where the shell is arranged to oscillate, as described, the vessel V is made of such a shape as will permit the shell to readily oscillate therein. This description of filter is especially valuable where the water is very muddy, the preliminary filter $S^1$ in the cylinder $S^2$ operating to prevent the greater portion of the impurities in said liquid from passing into the water-space surrounding the filter proper, thus relieving the latter from much extraneous dirt and keeping it longer clean.

An additional preventive against turbid water, and an additional aid to the filter, is shown in the device, Fig. 13, where the vessel A, in which the shell $r$ oscillates, contains an extra diaphragm, I, composed of a proper filtering material, and which divides this vessel into two compartments, one of which, C, receives the fresh impure liquid, and the other, D, the liquid as it filters through the diaphragm.

In the drawing, the shell $r$ is placed in the compartment D in such a manner that the mouth $S^2$ shall be immersed in the liquid when the said compartment is properly filled. The shell $r$ oscillates on the journals on the open box $i$.

The journal-boxes are left open in order that the shell $r$ may be the more readily removed from the vessel A.

The diaphragm I is of advantage in two respects: first, it prevents the greater portion of the impurities of the liquid from entering the compartment D, and it also helps form a settling-compartment, wherein much of the sand, mud, and other foreign substances held in the liquid may settle. This diaphragm is preferably made of flannel or felt, and secured in place by a groove at each side and at the bottom of the vessel, into which it is slid. The compartment C is provided with a cock or plug, X, whose removal enables the vessel to be easily cleaned of sediment precipitated from the unfiltered liquid.

As before remarked, my filter can be employed as a dripping filter, in which case the filter is so placed that the delivery-tube $t$ discharges underneath the filter; but, although the filter will thus make a good dripping-filter, superior to any in use, such purpose is not the primary one for which it was designed, that object being to operate in connection with some device whereby the pressure of the atmosphere is employed to force the liquid to be filtered through the filter from without to the central receptacle within. For this purpose, in house-filters, I usually employ a siphon the short arm of which is attached to the end of the delivery-tube $t$, and the long arm being ready to deliver the liquid, as it is filtered, into any appropriate vessel placed beneath it. The simplest form of such connection is shown in Fig. 3, where the filter B is placed in the vessel A, filled with, say, water, and the siphon $h$ delivers the same, as fast as it is drawn through the filter, into a vessel placed below the end of the siphon. Preferably a cock, $H^3$, is placed in the long arm of the siphon, below a horizontal plane passing through the end of the short arm of the siphon, said cock being for the purpose of regulating or entirely shutting off the flow of water through the siphon.

A form of my invention quite applicable to dwellings, for use as a fixture in the kitchen, bath-room, and the like, is that shown in Fig. 1, where the tank A, attached to the side of the wall, or supported in any convenient method, contains one of my filters, the long arm of whose siphon passes through the bottom of A, along the wall, and down to a faucet, preferably placed over a sink or bowl, or the like. Attached to the pipe which admits the water into the vessel is a cock and float-ball faucet, the ball of which floats on the water in vessel A, and as fast as the water in the vessel is diminished by being drawn off through the filter by opening the lower faucet the float-ball is depressed, and admits fresh unfiltered water into the vessel until the latter is filled, when the elevation of the floating ball cuts off the supply of water.

A provision for a large supply of filtered water is seen in the devices shown in Fig. 2, where vessel A is provided, as before mentioned, with a filter and a float-ball and cock, $H\ l\ F$, to regulate the height of water therein.

The long arm of the siphon is here, for convenience, brought down and out at the front of the vessel A, and terminates in a ball-float and cock, $H^1\ l\ F'$, the ball of which floats on and regulates the height of the filtered water in vessel A' placed directly beneath the faucet $H^1$. Vessel A' is provided near or at its bottom with a cock for regulating the withdrawal of the filtered water as needed. It will thus be perceived that one can have on hand as large a supply of filtered water as desired, as the vessel A' can be made of any desired capacity.

The operation of the combined vessels A

A' and their regulating-cocks is very simple. The float-ball and cock H $l$ F will admit water into A whenever the latter is not full, and the float-ball and cock H$^1$ $l$ F' will cause water to flow through the filter B and pass through the siphon $h$ whenever the vessel A' is not full.

In connection with this last-mentioned combination may be cited the device shown in Fig. 14, viz., an arrangement for increasing the flow of filtered liquid. This novel arrangement consists in grouping filters within the vessel receiving the unfiltered water, and grouping them around a common central receiving-tube, which receives the long arm of the siphon of each filter, and terminates below the same in a delivery-spout. The flow through this spout is regulated by a faucet, and, where the spout delivers immediately into any vessel which the party drawing the filtered water may choose to place beneath the same, the faucet is one to be worked by hand. Where a supply is to be kept on hand ready for delivery, the spout is provided with a ball-and-cock faucet, and the spout delivers into a vessel, A', placed beneath, so that the ball F shall close the faucet when the vessel is full. A faucet, H$^2$, is located near the bottom, to regulate the delivery of the water therefrom.

In the vessel shown in Fig. 13, which, it will be remembered, contained the diaphragm I, the supply of unfiltered water to compartment G is preferably automatically regulated by a cock-and-ball faucet. The bottom of the said vessel is also furnished with a plug, X, to enable the débris, sediment, and the like to be easily withdrawn from the vessel.

I find a very useful application of the filter is to combine it with a water cooler. A very convenient mode of thus adapting it is shown in Fig. 10, where B represents the filter supported on a tripod, U, in order to keep the lower portion of the filter out of contact with the bottom of the cooler and the sediment that settles there, and give said lower portion of the filter a better opportunity to absorb its share of unfiltered water. The usual siphon $h$ is placed in the filter, and terminates outside the cooler, at or near the bottom, in a faucet, H$^1$, for regulating the flow of water.

The sides, bottom, and cover of the cooler are made non-conducting, as is customary. In the cooler shown the sides and bottom consist of two different sheets or thicknesses of metal, between which occurs a space, $i'$, filled with a non-heat-conducting material. The ice is placed in the unfiltered water, and cools the same. The filter thus filters the ice-water and removes any impurities imparted to or left in the water by the melting ice, as well as the impurities originally in the water itself.

In starting the flow of water through the siphon, when the filter is first set up, or has been cleaned, or by accident the water in the vessel containing the filter and that in the siphon has been exhausted, the siphon may be laid on its side in the water, or so inverted that the water can be poured into the open end of its long arm, and the water thus be made to fill both arms thereof; but these methods are tedious, inconvenient, and disagreeable. For these reasons I suggest either of the devices shown in Fig. 4 may be conveniently used, the uppermost of which consists of a flexible tube, $h^1$, and rubber bulb $c$. The bulb being compressed, the open end of the tube $h^1$ is fitted over the mouth of the faucet H$^1$, which communicates with the long end of the siphon, and the bulb, being allowed to expand, draws the water through the filter and siphon by suction.

Another and simpler device is that shown in same figure below the preceding. It consists of a rubber tube, $h^2$, terminating at one end in a mouth-piece, $m$. The other end is to be drawn over the mouth of the faucet H$^1$. The operator, applying his mouth to the mouth-piece, exhausts the air in the tube, and thus draws the water through the filter and siphon, and then removes the tube from the faucet.

When my filter is to be employed to filter the water of a cistern or well, a convenient mode of applying it for that purpose is shown in Fig. 12, where the filter is placed, preferably, quite near the bottom of the well or cistern, and the receptacle-pipe of the filter is connected to a pipe which leads upward, and is connected with a suction or lifting pump, $e$, whereby the water is drawn through the filter and tube, and delivered from the mouth of the pump, as desired.

A convenient form of traveler's filter is shown in Fig. 11, where a filter (seen in dotted lines) is united to a flexible tube, $f$, to which is attached a hand flexible globular pump, Y. This latter operates as a suction and force pump, drawing the water through the filter and tube $f$, and forcing same through the branch $f'$, attached to the other end of the pump, into a cup or receptacle, X', as shown. This form of filter can be made sufficiently compact to be carried while traveling, and can be readily and effectively employed at all times and places.

The filter proper may be placed in the running stream or lake, or in any small vessel containing the water of the region, and by a few contractions of the pump Y by the hand the traveler is enabled to obtain pure water, and thus avoid a principal danger to health incident to drinking water to which the traveler is not accustomed.

The filter B, before referred to, can be readily cleansed by forcing a current of water through the central receptacle-tube, and thence through the filter, from the center to the periphery. This can be accomplished by connecting the long arm of the siphon-tube, or the delivery end of the central receptacle, with a hydrant or force-pump or funnel. When the funnel is used the long arm of the siphon, in the end of which the funnel is inserted, should be raised as high as practicable, in order to secure as much pressure as possible, and then the water may be poured into the funnel. In these ways the filter can be readily and perfectly cleaned.

It sometimes happens that the filter becomes clogged with matter which is insoluble in cold water. When such is the case resort may be had to boiling water, either pure or rendered alkaline by the addition of borax or other suitable substance. This hot water may be made to pass through the filter by means of the force-pump or funnel, &c., before mentioned.

What I claim as new, and desire to secure by Letters Patent, is—

1. A filter composed of an exterior porous or perforated vessel, containing the filtering material, and a central interior vessel for receiving the filtered liquid, in combination with a siphon for drawing the filtered liquid from said central vessel, substantially as specified.

2. The combination of filter, siphon, faucets, vessel A, and float-ball and cock, shown in Fig. 1, for the purpose set forth.

3. A filter composed of an exterior porous or perforated vessel, containing the filtering material, and a central interior vessel for receiving the filtered liquid, in combination with means tending to produce a vacuum in the central receiving-vessel, substantially as specified.

CHARLES F. VENT.

Attest:
HERMANN LAUTENSCHLAGER.
C. WALTON, Jr.